United States Patent
Koide et al.

(10) Patent No.: US 8,344,298 B2
(45) Date of Patent: Jan. 1, 2013

(54) PROCESS OF MEASURING THE TEMPERATURE OF COIL END PART AND THE STATOR CORE

(75) Inventors: Satoshi Koide, Okazaki (JP); Hideaki Kimura, Okazaki (JP); Masahiko Sakao, Toyota (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 747 days.

(21) Appl. No.: 12/526,145

(22) PCT Filed: Jan. 23, 2008

(86) PCT No.: PCT/JP2008/051331
§ 371 (c)(1), (2), (4) Date: Aug. 6, 2009

(87) PCT Pub. No.: WO2008/096644
PCT Pub. Date: Aug. 14, 2008

(65) Prior Publication Data
US 2010/0320194 A1  Dec. 23, 2010

(30) Foreign Application Priority Data
Feb. 8, 2007  (JP) ................................ 2007-028703

(51) Int. Cl.
*H05B 6/10* (2006.01)

(52) U.S. Cl. ........................................ 219/636; 219/672
(58) Field of Classification Search .................. None
See application file for complete search history.

(56) References Cited

U.S. PATENT DOCUMENTS 6,960,845 B2 * 11/2005 Koide .................. 310/12.15
7,279,859 B2 * 10/2007 Hill ..................... 318/400.01

FOREIGN PATENT DOCUMENTS

| EP | 2110932 A1 * | 10/2009 |
| JP | 60-082050 A | 5/1985 |
| JP | 6-303746 A | 10/1994 |
| JP | 3070725 B2 | 5/2000 |
| JP | 2003-535562 A | 11/2003 |
| JP | 2007-097238 A | 4/2007 |
| JP | 2008-118731 A | 5/2008 |
| JP | 2008-172961 A | 7/2008 |

* cited by examiner

*Primary Examiner* — Alonzo Chambliss
(74) *Attorney, Agent, or Firm* — Kenyon & Kenyon LLP (57) ABSTRACT

In a method of heating a stator, a first induction coil is disposed near one of the coil ends of the stator, and a second induction coil is disposed near the other, and the first induction coil and the second induction coil are electrically energized, whereby the induction-heating of the stator is performed as a pre-heating step prior to the resin molding step of the coil ends. According to this method, a first movement unit for moving the first induction coil and a second movement unit for moving the second induction coil are provided, the first induction coil is moved by the first movement unit and the second induction coil is moved by the second movement unit for induction-heating of the stator.

5 Claims, 5 Drawing Sheets

PROCESS OF MEASURING THE TEMPERATURE OF COIL END PART AND THE STATOR CORE

This is a 371 national phase application of PCT/JP2008/051331 filed 23 Jan. 2008, claiming priority to Japanese Patent Application No. 2007-028703 filed 08 Feb. 2007, the contents of which are incorporated herein by reference.

TECHNICAL FIELD

The present invention relates to a technique for uniformly heating a coil end part and a stator core of a stator of a motor in order to subject them to pre-heating, annealing process, and others.

BACKGROUND ART

A stator to be used in a motor has a core end part insulated and protected by a varnish impregnating method in which varnish is impregnated between wire cores each being wound on a stator core and then the varnish is heated to be solidified or by a resin-molding method in which the core end part of the stator is injection-molded with resin by use of a die to fill insulating resin between wire cores.

As the method of impregnating varnish between the wire cores, there are known an impregnating method conducted by dropping varnish while rotating the stator and a dipping method conducted by dipping a lower part of each wire coil in a varnish bath to impregnate varnish by capillary phenomenon.

Both cases need, before and after a molding process, a pre-heating and drying process for removing moisture from each wire coil exposed in each coil end part of the stator and reducing winding stress (annealing process) and a stator heating process for heating each wire coil to solidify the varnish.

When the coil end parts of the stator are to be resin molded, similarly, pre-heating is required.

Resin to be used in the resin-molding is generally a heat-hardening type. This is because, when the stator is inserted in a die and injection-molded, it will take much time to harden the resin unless the stator is heated in advance. Even when a thermoplastic resin is used, flowability thereof tends to remarkably deteriorate during resin molding unless the stator is heated in advance. This may cause a defect such as insufficient fill.

From the above reasons, even when the coil end parts are resin molded, the stator has to be pre-heated in advance uniformly in a constant temperature range. The resin to be used in resin-molding may include unsaturated polyester resin, PPS resin, LCP resin, etc.

The stator is constituted of a stator core and wire coils mounted in the stator core. Recently, in some cases, a thin-sheet laminated coil, an edgewise wound coil, and other coils are used instead of the wire coil.

Ideally, such stator is uniformly heated in the aforementioned pre-heating process. This pre-heating of the stator is disclosed in many documents.

For example, JP60(1985)-82050A discloses a method of induction-heating using a heating coil and pre-heating a stator by irradiation of infrared rays.

However, in the method in which the stator is inserted and heated in a hollow heating coil as disclosed in JP60-82050A, most of magnetic flux generated from the heating coil would act on outer peripheral end parts of the core. This results from that the stator core is often formed of a laminated body of silicon steel sheets, which is lower in heat conductivity than a typical coil formed of copper.

SUMMARY OF INVENTION

Technical Problem

Therefore, the applicants studied a technique in which high-frequency induction heating coils are disposed near coil end parts at both ends of a stator respectively to allow a large amount of high-frequency magnetic flux to pass through the coil end parts, thereby preventing local heating of the core outer peripheral end portions, and enabling uniform heating of the stator.

However, the technique studied by the applicants would be insufficient to achieve the purpose of efficiently heating the stator.

(1) In the technique studied by the applicants, the induction heating coil and a shielding plate are used to control a heating amount.

In the case of warming the stator by induction heating, the stator core is apt to be heated earlier than the conducting coil as mentioned above. When the magnetic flux passing through a material produces an electric current therein, the material generates heat. Thus, a passing amount of magnetic flux greatly influences the heat generation. The density of generated magnetic flux decreases in inverse proportion to the distance from the induction heating coil. Accordingly, even when the induction heating coil is merely moved by about several millimeters, a heating condition may change.

Therefore, part of the magnetic flux is restricted by the shielding plate to avoid excessive heating of the stator core, thereby reducing a temperature difference between the stator core and the induction coil.

However, such shielding of the magnetic flux leads to loss of energy of the induction heating coil and hence the efficiency is slightly sacrificed. Induction heating is considered as an efficient heating method. If a large amount of electric power is to be supplied to the induction heating coil, it is necessary to enhance the cooling ability of cooling water flowing in the induction heating coil for cooling. Therefore, it is preferable to convert the generated magnetic flux to heating of the stator.

(2) Furthermore, the use of only the shielding plate as in the technique studied by the applicants could not sufficiently reduce the temperature difference between the stator core and the coil ends.

The induction heating has a tendency to more easily heat an object in a place nearer the induction heating coil. Accordingly, for example, the surface of the stator core is heated earlier than the inside of the stator core. Heating the stator core at uniform temperature therefore needs to depend on heat transfer. In an actual process, a soaking time is provided after pre-heating by induction heating.

If the pre-heated stator has temperature variations, problems would occur that defects or failures are caused in subsequent varnish applying process and resin-molding process. Therefore, the soaking treatment is usually performed. Specifically, the stator is left standing until the temperature difference disappears by heat transfer. If the temperature difference between the stator core and the coil end is large, it will inevitably take much time before the temperature of the stator core and the temperature of the coil end become equal, leading to a long cycle time.

Therefore, it is preferable to minimize the temperature difference between the stator core and the coil end in the pre-heating process to reduce temperature variations in the stator.

The present invention has been made to solve the above problems and has a purpose to provide a method of efficiently heating a stator by reducing a temperature difference between a stator core and a coil end by using induction heating, and a heating device.

Solution to Problem

To achieve the above purpose, the method of heating a stator according to the present invention has the following features.

(1) In a method for heating a stator formed in a manner that a conducting coil is mounted on a stator core formed of laminated steel sheets, the method comprising disposing a first induction coil near one of coil end parts of the stator and a second induction coil near the other coil end part, energizing the first induction coil and the second induction coil to induction heat the stator as pre-heating prior to a resin-molding process or a varnish applying process of the coil end parts, the method includes: a first coil movement means for moving the first induction coil in an axial direction of the stator; and a second coil movement means for moving the second induction coil in the axis direction of the stator, and the first induction coil is moved by the first coil movement means, the second induction coil is moved by the second movement means, and the first and second induction coils are energized to induction heat the stator.

(2) In the stator heating method described in (1), the method includes temperature measuring means for measuring temperatures of the coil end part and the stator core of the stator, and based on a temperature difference between the coil end part and the stator core measured by the temperature measuring means, the first induction coil is moved by the first coil movement means and the second induction coil is moved by the second coil movement means.

(3) In the stator heating method described in (2), if the temperature difference is larger than a preset value, the first induction coil and the second induction coil are moved away from the stator core by the first coil movement means and the second coil movement means to adjust the temperature of the stator.

(4) In the stator heating method described in (2), if the temperature difference is smaller than a preset value, the first induction coil and the second induction coil are moved close to the stator core by the first coil movement means and the second coil movement means to adjust the temperature of the stator.

(5) In the stator heating method described in (1), the method includes control means for controlling the first coil movement means and the second coil movement means, and after a lapse of a predetermined time, the control means controls the first coil movement means to move the first induction coil and controls the second coil movement means to move the second induction coil.

Furthermore, to achieve the above purpose, the stator heating device according to the present invention has the following features.

(6) In a device for heating a stator formed in a manner that a conducting coil is mounted on a stator core formed of laminated steel sheets, the device comprising a first induction coil to be disposed near one of coil end parts of the stator and a second induction coil to be disposed near the other coil end part, the first induction coil and the second induction coil being arranged to be energized to induction heat the stator as pre-heating prior to a resin-molding process or a varnish applying process of the coil end parts, the device includes: a first coil movement means for moving the first induction coil in an axial direction of the stator; a second coil movement means for moving the second induction coil in the axis direction of the stator; and control means for controlling the first coil movement means and the second coil movement means.

(7) In the stator heating device described in (6), the device includes temperature measuring means for measuring temperatures of the coil end part and the stator core of the stator, and the control means is adapted to control, based on a temperature difference between the coil end part and the stator core measured by the temperature measuring means, the first coil movement means to move the first induction coil and the second coil movement means to move the second induction coil.

The stator heating method according to the present invention having the above features can provide the following operations and effects.

(1) Firstly, the invention described in (1) is a method for heating a stator formed in a manner that a conducting coil is mounted on a stator core formed of laminated steel sheets, the method comprising disposing a first induction coil near one of coil end parts of the stator and a second induction coil near the other coil end part, energizing the first induction coil and the second induction coil to induction heat the stator as pre-heating prior to a resin-molding process or a varnish applying process of the coil end parts, wherein the method includes: a first coil movement means for moving the first induction coil in an axial direction of the stator; and a second coil movement means for moving the second induction coil in the axis direction of the stator, and the first induction coil is moved by the first coil movement means, the second induction coil is moved by the second movement means, and the first and second induction coils are energized to induction heat the stator.

Accordingly, the following operations and effects can be obtained.

As mentioned above, a heating speed of a conducting coil is slower than a stator core. Thus, the stator core will usually reach the limit temperature earlier. This results from differences in resistance value and shape between the stator core and the conducting coil. Ideally speaking, it is preferable to supply necessary amounts of magnetic flux to the stator core and the conducting coil respectively in a ratio of the amount of magnetic flux passing through the conducting coil to the amount of magnetic flux passing through the stator core to make their temperature increasing speeds equal. On the other hand, it is difficult to optimize the amount of magnetic flux by changing the shapes of the first induction coil and the second induction coil.

Therefore, the first induction coil and the second induction coil are moved to change respective distances from the stator core, thereby adjusting the amount of magnetic flux allowed to pass through each of the stator core and the conducting coil so that respective total amounts of magnetic flux become an ideal ratio within the heating time. It is therefore possible to enhance the heating efficiency and reduce the temperature difference between the stator core and the conducting coil, thereby reducing temperature variations occurring in the stator.

If such temperature variations are reduced, the subsequent time needed for holding the stator in a hot-air oven to uniformize the temperature of the stator can be shortened.

Furthermore, in the invention described in (2), in the stator heating method described in (1), the method includes temperature measuring means for measuring temperatures of the coil end part and the stator core of the stator, and based on a temperature difference between the coil end part and the stator core measured by the temperature measuring means, the first induction coil is moved by the first coil movement means and the second induction coil is moved by the second coil movement means. Accordingly, the positions of the first induction coil and the second induction coil can be adjusted while the temperatures are monitored. Thus, more effective induction heating can be achieved.

The temperature of the stator core easy to be heated and the temperature of the conducting coil hard to be heated cause a temperature difference when they are induction heated. The difference is particularly generated between the stator core and the coil end parts outside the stator core. For instance, such portions tending to cause a temperature difference are measured by the temperature measuring means and compared. If the temperature difference is judged to be large, the first induction coil and the second induction coil are moved to positions making the coil end easy to be heated and the stator core hard to be heated, thereby efficiently reducing the temperature difference between the stator core and the core end.

Furthermore, in the invention described in (3), in the stator heating method described in (2), if the temperature difference is larger than a preset value, the first induction coil and the second induction coil are moved away from the stator core by the first coil movement means and the second coil movement means to adjust the temperature of the stator. cl3 Since the coils are disposed apart from the stator core if the temperature difference is larger, the coil ends can be intensively heated to reduce the temperature difference.

At the start of heating, if the first induction coil and the second induction coil are disposed in positions allowing the stator core and the coil ends to be heated together, it is considered that the temperature of the stator core increases earlier and reaches the limit temperature, while the coil ends could not be heated sufficiently. When the temperature difference between the stator core and the coil end becomes more than a fixed value, the first induction coil and the second induction coil are moved away from the stator core to intensively heat the coil ends. This can efficiently heat the stator.

Furthermore, the invention described in (4), in the stator heating method described in (2), if the temperature difference is smaller than a preset value, the first induction coil and the second induction coil are moved close to the stator core by the first coil movement means and the second coil movement means to adjust the temperature of the stator. cl なし Accordingly, if the temperature difference becomes the fixed value or less, the first and second induction coils are moved close to each other to increase magnetic flux that passes through the stator core, thereby increasing the heating speed of the stator core.

In the stator heating method described in (4), contrary to the stator heating method described in (3), the first and second induction coils are disposed in positions in which they can intensively heat the coil ends at the start of heating. In this case, the coil ends are heated intensively and hence the temperature increasing speed of the stator core becomes slow. Because the heating speed of the coil is slower than the heating speed of the stator core, the efficiency is poor if the induction coils remain in the positions to heat. Consequently, based on the temperature difference considered as a trigger, the first and second induction coils are moved close to the stator core, so that the heating speed of the stator core can be increased, thereby efficiently heating the stator.

Furthermore, in the invention described in (5), in the stator heating method described in (1), the method includes control means for controlling the first coil movement means and the second coil movement means, and after a lapse of a predetermined time, the control means controls the first coil movement means to move the first induction coil and controls the second coil movement means to move the second induction coil. This needs no temperature measuring means, differently from the invention described in (2) to (4), and can move the first and second induction coils to thereby efficiently heat the stator.

In the case of mass production of stators, the stators equal in size would be heated in similar states. Accordingly, data on the temperature increasing states are obtained in advance. The time is set based on the data. At the stage after a predetermined time is elapsed from the start of induction heating, the control means causes the first coil movement means and the second coil movement means to move the first induction coil and the second induction coil respectively, thereby providing the effects similar to those in (3) and (4). Thus, the temperature difference between the stator core and the coil end can be reduced. Efficient stator heating can be realized at low cost.

Furthermore, to achieve the above purpose, the stator heating device according to the present invention has the following features.

The invention described in (6) is a device for heating a stator formed in a manner that a conducting coil is mounted on a stator core formed of laminated steel sheets, the device comprising a first induction coil to be disposed near one of coil end parts of the stator and a second induction coil to be disposed near the other coil end part, the first induction coil and the second induction coil being arranged to be energized to induction heat the stator as pre-heating prior to a resin-molding process or a varnish applying process of the coil end parts, wherein the device includes: a first coil movement means for moving the first induction coil in an axial direction of the stator; a second coil movement means for moving the second induction coil in the axis direction of the stator; and control means for controlling the first coil movement means and the second coil movement means. Accordingly, the position of the first induction coil or the second induction coil is moved to the optimal position for heating, thereby efficiently heating the stator. Thus, temperature variations occurring in the stator can be reduced.

If the temperature variations are reduced, the subsequent time needed for holding the stator in the hot-air oven to uniformize the temperature of the stator can be shortened, thereby allowing the temperature of the stator to be uniformized efficiently.

In the invention described in (7), in the stator heating device described in (6), the device includes temperature measuring means for measuring temperatures of the coil end part and the stator core of the stator, and the control means is adapted to control, based on a temperature difference between the coil end part and the stator core measured by the temperature measuring means, the first coil movement means to move the first induction coil and the second coil movement means to move the second induction coil. Accordingly, temperature variations in the stator can be minimized.

DESCRIPTION OF EMBODIMENTS

A detailed description of a preferred embodiment of the present invention will now be given referring to the accompanying drawings.

Firstly, a heating method and a configuration of heating device of the present embodiment will be explained briefly and schematically.

Figure 1:
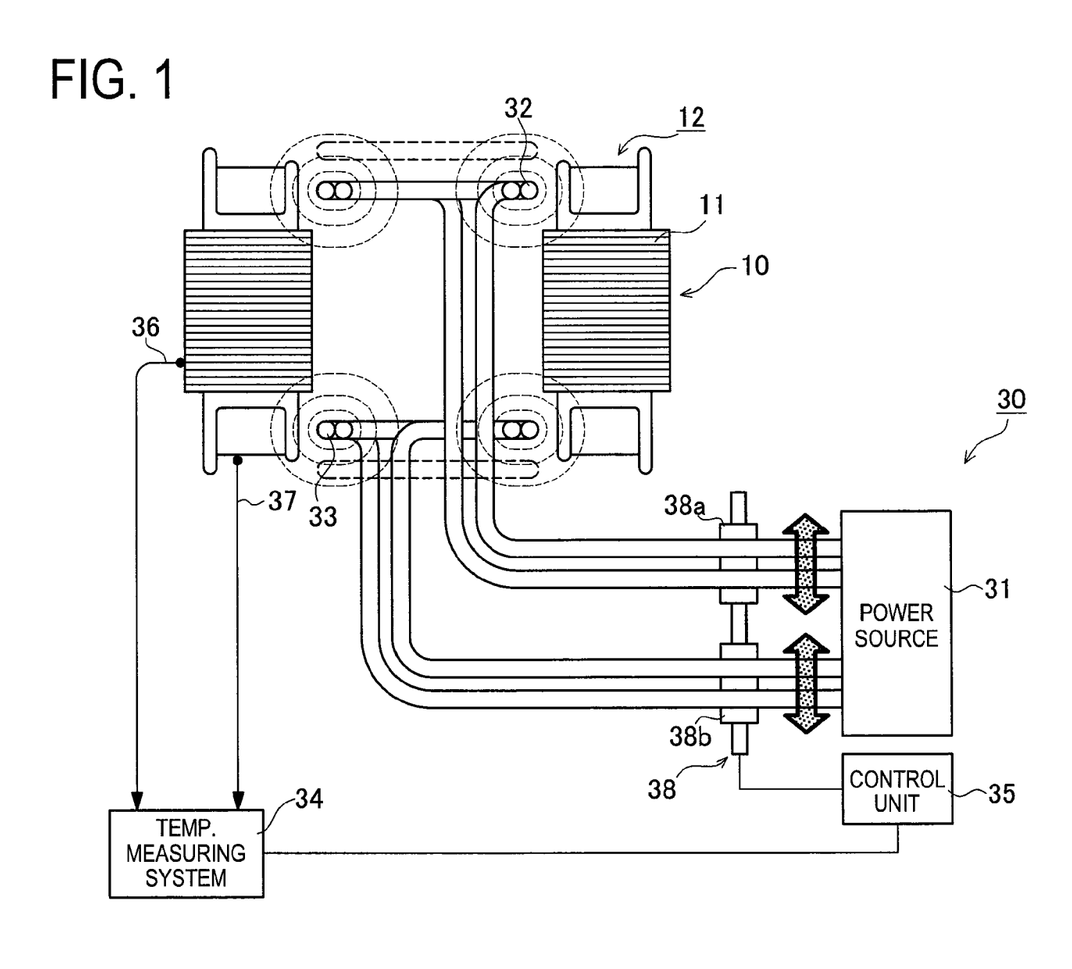
FIG. 1 is a schematic view of a heating device of an embodiment.
Figure 2:
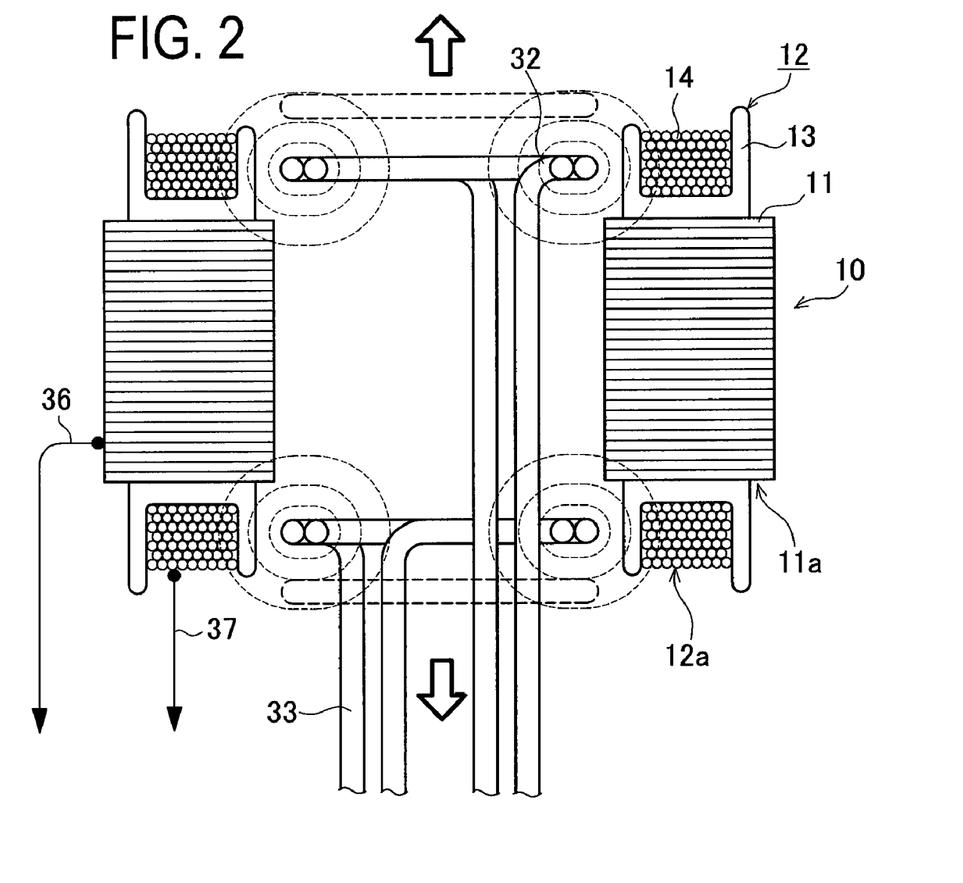
FIG. 2 is an enlarged cross-sectional view showing a stator and its surrounding in FIG. 1 in the embodiment.

FIG. 1 is a schematic view of a heating device 30 of the present embodiment. FIG. 2 is an enlarged cross-sectional view of a stator 10 and its surrounding in FIG. 1.

The heating device 30 includes a power source 31, a first induction coil 32, a second induction coil 33, and a temperature measuring system 34.

The power source 31 generates an alternating current to supply power to the first induction coil 32 and a second induction coil 33. Each of the first induction coil 32 and the second induction coil 33 is formed of a hollow pipe having a diameter of about 10 mm and a circularly wound form. The hollow pipe is made of a high-conductive material such as copper and designed to allow cooling water supplied from a chiller not shown to circulate therethrough.

The first induction coil 32 and the second induction coil 33 are configured respectively to be moveable in an axial direction of the stator 10. A position adjustment device 38 includes a first movement unit 38a for moving the first induction coil 32 and a second movement unit 38b for moving the second induction coil 33. The first movement unit 38a and the second movement unit 38b are individually movable in the axial direction of the stator 10.

A control unit 35 for controlling the position adjustment device 38 is able to move the first movement unit 38a and the second movement unit 38b based on data of the temperature measuring system 34 connected to the position adjustment device 38. A power source of the movement units 38a and 38b may be for example a lifting mechanism utilizing a fluid by use of a cylinder or a mechanism for moving up/down the coils 32 and 33 by use of a motor. However, such mechanism has to hold the first and second induction coils 32 and 33 in insulating relation therefrom. Therefore, an insulating ceramic such as alumina is used to hold the coils.

The stator 10 includes a stator core 11 and a coil 12 as shown in FIG. 2. The stator core 11 is formed of laminated steel sheets in a cylindrical shape. The coil 12 is formed of a wire 14 wound on an insulator 13. For convenience of explanation, a portion of the coil 12 outside a core end face 11a of the cylindrical stator core 11 is referred to as a core end 12a.

The stator core 11 and the coil 12 are connected to the temperature measuring system 34 through a core temperature measuring element 36 and a coil temperature measuring element 37 to measure temperatures. The core temperature measuring element 36 and the coil temperature measuring element 37 may be non-contact temperature measuring devices. Such non-contact temperature measuring device may be selected from for example an infrared irradiation thermometer, a non-contact sensing thermocouple, etc. Temperature measuring points on the stator core 11 and the coil 12 may be plural.

In this embodiment, the core temperature measuring element 36 is placed in contact with an end portion of the stator core 11 and the coil temperature measuring element 37 is placed in contact with the coil end 12a of the coil 12 to measure respective temperatures. This is because the temperature of the end portion of the stator core 11 is easy to increase and the temperature of the coil end 12a is hard to increase. In other words, the measuring points are selected at which a difference in temperature is likely to occur between the core temperature measuring element 36 and the coil temperature measuring element 37. These points may be changed appropriately because they are required to be hardly affected by disturbance.

The temperature measuring system 34 is configured to measure the temperatures of the core temperature measuring element 36 and the coil temperature measuring element 37 to calculate the temperature difference therebetween. Another configuration may be adopted such that the temperature measuring system 34 simply transmits the measured data to the control unit 35 and the control unit 35 calculates a temperature difference.

Figure 3:
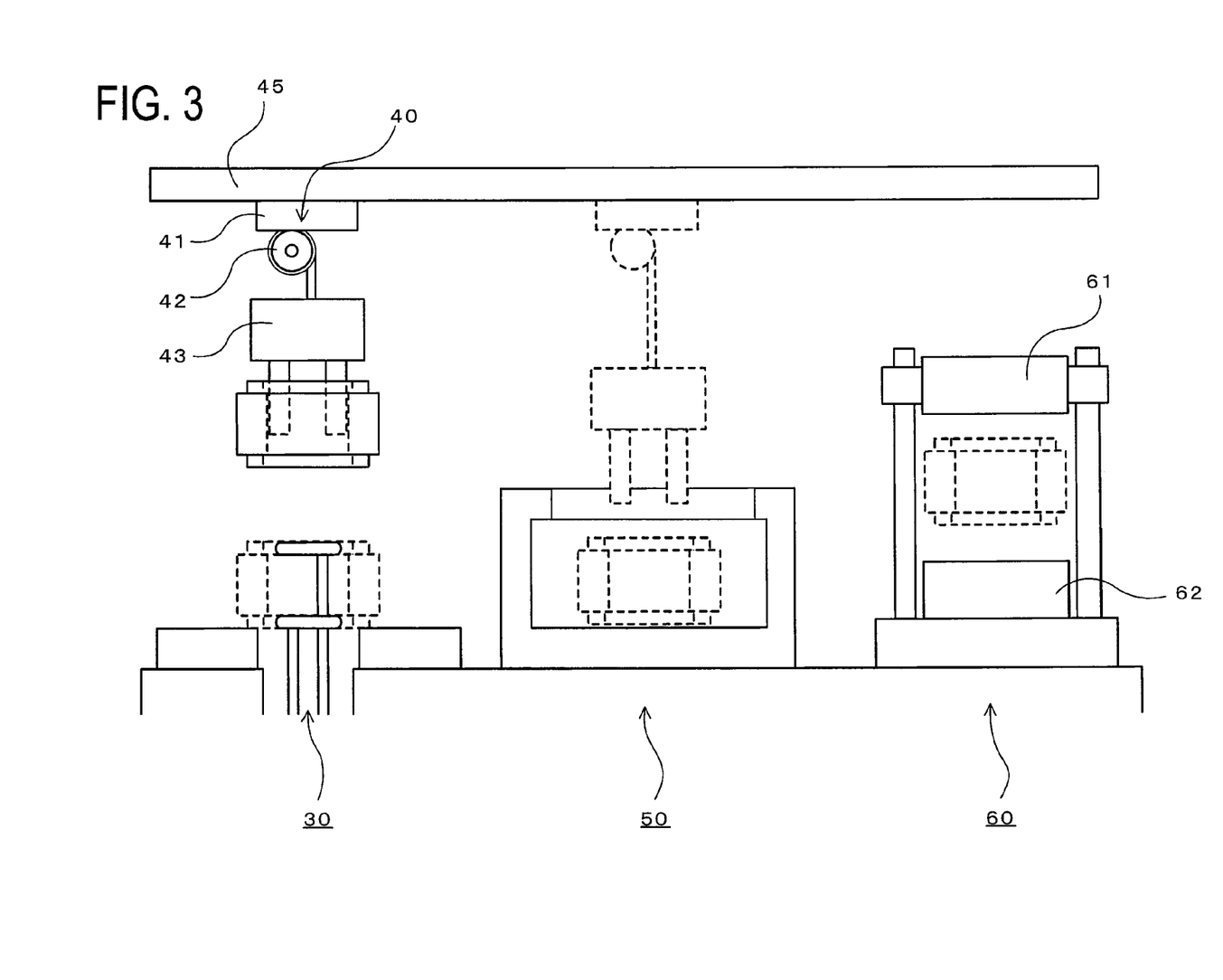
FIG. 3 is a schematic view showing part of a production process in the embodiment.

FIG. 3 is a schematic view of a part of a production process.

In the production process of the stator 10, the stator 10 is assembled in advance and then is pre-heated in the heating device 30. The stator 10 is successively subjected to soaking in a hot-air oven 50. In a resin-molding device 60 for resin-molding the stator 10 having been subjected to soaking, the coil ends 12a of the stator 10 are molded by resin.

A conveying device 40 includes a chuck 43 and a lifting device 42 for moving up/down the chuck 43, which are provided in a traversing device 41 constituted of a trolley or the like. The traversing device 41 is movable along a beam 45 provided thereon. The conveying device 40 may be combined with a belt conveyor or the like if the working places are apart. The conveying device 40 may also be handled by an industrial robot.

In the hot-air oven 50, hot air of a predetermined temperature is blown on the stator 10, thereby uniformizing the temperature distribution in the stator 10 heated in the heating device 30.

In the resin-molding device 60, the stator 10 is placed between an upper die 61 and a lower die 62 which are connected to an injection molding device not shown. Thus, the coil ends 12a are resin-molded and insulated.

This resin-molding device 60 may be replaced with a varnish applying device.

Through the above steps, the stator 10 is produced.

The present embodiment configured as above exhibits the following operations.

In a previous step to the heating device 30, the stator 10 is assembled by mounting the coil(s) 12 on the stator core 11 and joining connection terminals and other in advance. The stator 10 is conveyed by the conveying device 40 to the heating device 30 and set in a predetermined place.

The stator 10 is disposed so that the first and second induction coils 32 and 33 are respectively positioned around the centers of the coil ends 12a of the stator 10.

In the heating device 30, the first and second induction coils 32 and 33 are energized by alternating current supplied from the power source connected thereto to start heating. When the first and second induction coils 32 and 33 are energized by the alternating current, magnetic flux passes through the coil ends 12a near the coils and the stator core 11 and causes eddy current, thereby causing the stator 10 to generate heat by its internal resistance.

Figure 4:
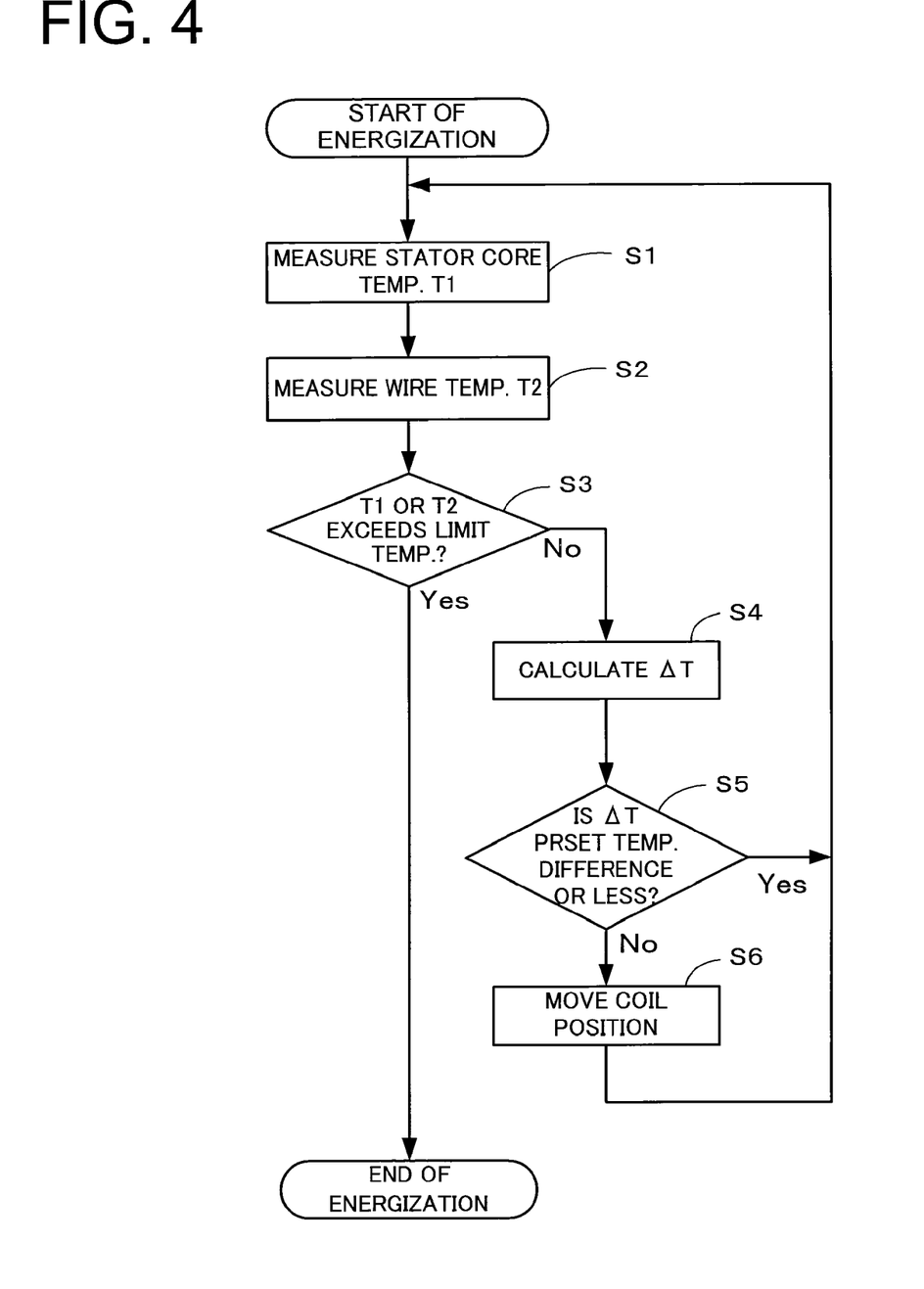
FIG. 4 is an example of a flow of controlling positions of a first induction coil and a second induction coil in the embodiment.

FIG. 4 shows an example of a flow of controlling the positions of the first and second induction coils 32 and 33.

After the stator 10 is set in the heating device 30, energization of the first and second induction coils 32 and 33 by the power source 31 is started.

In S1, a stator core temperature T1 which is the temperature of the stator 10 is measured. The flow then goes to S2.

In S2, a wire temperature T2 which is the temperature of the coil 12 is measured. The flow then goes to S3.

In S3, it is checked whether or not the stator core temperature T1 or the wire temperature T2 exceeds a preset limit temperature. The preset limit temperature is determined at such a level as not to cause burnout of enamel or the like coating the insulator 13 and the wire 14 of the coil 12 used in the stator 10 and thereby to prevent the life of a motor from remarkably becoming shortened if the stator 10 is used therein. The stator core temperature T1 or the wire temperature T2 is more than the preset limit temperature (S3: Yes), the energization is stopped to terminate induction heating. If not more than the present limit temperature (S3: No), the flow advances to S4.

In S4, a temperature difference dT is calculated. This dT represents a temperature difference between the stator core temperature T1 and the wire temperature T2. The flow then goes to S5.

In S5, it is checked if the temperature difference dT is a preset temperature difference or less. If the temperature difference dT is the preset temperature difference or less (S5: Yes), the flow goes back to S1. If the temperature difference dT is larger than the preset temperature difference (S5: No), the flow advances to S6.

In S6, the first induction coil 32 and the second induction coil 33 are moved. Thereafter, the flow goes back to S1. The first and second induction coils 32 and 33 are initially placed in respective positions indicated by solid lines as shown in FIGS. 1 and 2 and are then moved to positions indicated by broken lines. Accordingly, each moving amount is about several millimeters.

This flowchart is simply described but does not exclude appropriate changes, for example, the addition of a timer for preventing intervals of calculating dT from shortening. This is made by considering that the core temperature measuring element 36 and the coil temperature measuring element 37 may overshoot and hence not follow temperature changes precisely.

While changes in the temperatures of the stator core 11 of the stator 10 and the coil end 12a of the coil 12 are checked by the procedure shown in FIG. 4, the positions of the first induction coil 32 and the second induction coil 33 are adjusted.

This positional adjustment is considered to be preferably conducted once or twice because the heating time of the stator 10 is as short as about several tens seconds. According to circumferences that an induction heating time is set long or a more effective temperature rise is expected, the number of positional adjustment operations of the first induction coil 32 and the second induction coil 33 may be further increased.

In the heating device 30, after heating for a predetermined time, the stator 10 is conveyed by the conveying device 40 to the hot-air oven 50. In the hot-air oven 50, hot air is blown on the stator 10 for several minutes to soak the stator 10. While a little hotter air than a target set temperature is blown on the stator 10 placed at rest, the temperature distribution is uniformized by heat transfer.

The soaked stator 10 is put in a predetermined position in the resin-molding device 60. The stator 10 is interposed between the upper die 61 and the lower die 62 and molded with resin. When each coil end 12a of the stator 10 is to be resin-molded, the temperature of the stator 10 has been uniformized at a fixed temperature. This can prevent loss of heat in the process of the resin-molding, thus avoiding defects such as resin solidification or molding failure.

The present embodiment providing the aforementioned configuration and operations can exhibit the following effects.

Figure 5:
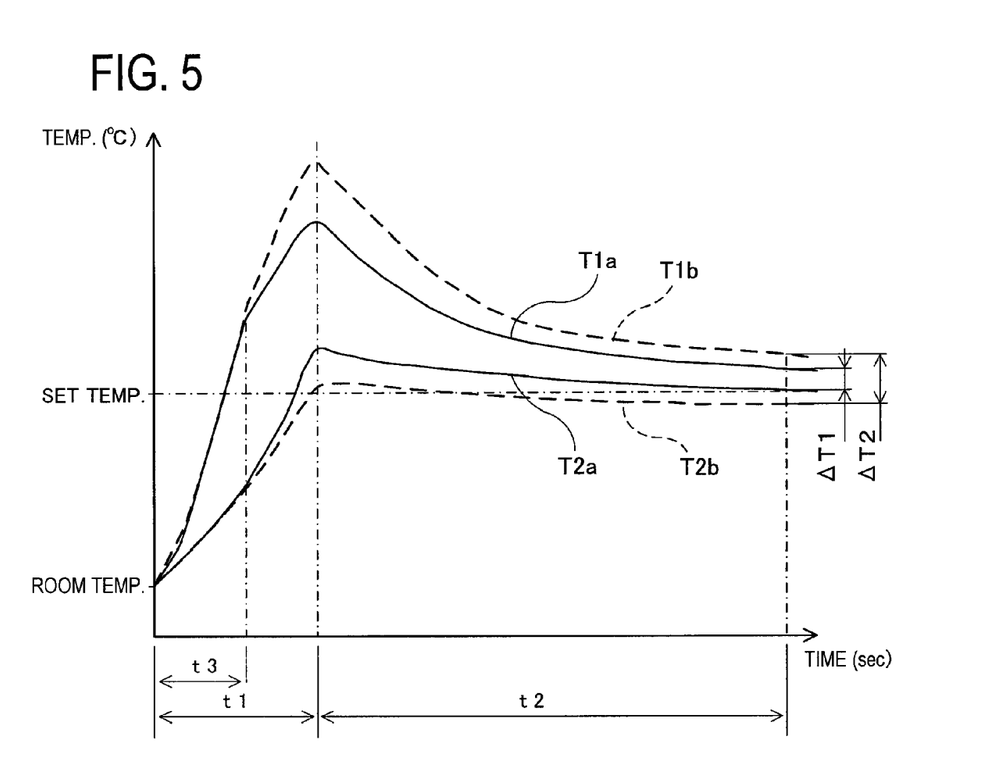
FIG. 5 is a graph showing variations with time of core temperature and coil temperature in the embodiment.

FIG. 5 is a graph showing changes with time in core temperature and coil temperature.

A vertical axis indicates temperature and a lateral axis indicates elapsed time.

A curve of a core temperature T1a and a curve of a coil temperature T2a plotted by solid lines represent results obtained after movement of the first induction coil 32 and the second induction coil 33 in the present embodiment.

Furthermore, a curve of a core temperature T1b and a curve of a coil temperature T2b plotted by broken lines represent results obtained without movement of the first induction coil 32 and the second induction coil 33.

A heating time t1 is the time for heating by use of the first induction coil 32 and the second induction coil 33 in the heating device 30 shown in FIG. 3. A soaking time t2 is the time for which a soaking treatment is conducted by blowing hot air on the stator 10 in the hot-air oven 50.

Heat generation of the stator 10 depends on the density of magnetic flux passing therethrough. The shorter the distance from first and second induction coils 32 and 33 and the more the passing magnetic flux, the easier the stator 10 is heated.

However, as mentioned in the Technical Problem section, the coil 12 is hard to generate heat as compared with the stator core 11 due to a difference in conductivity between respective materials. As compared with the stator core 11 formed of laminated steel sheets, the coil 12 is formed of the wound wire 14. The wire 14 is generally made of a low resistance material such as copper and aluminum and therefore less generates heat by resistance. The number of magnetic flux lines passing through the stator core 11 and the coil 12 differs according to their shapes. This is a factor that makes the coil 12 hard to generate heat.

The core temperature T1a increases at an initial stage in the same curve as the core temperature T1b but then increases slowly after an elapsed time t3 for which the first induction coil 32 and the second induction coil 33 were moved. This results from that the passing amount of magnetic flux to the stator core 11 decreased.

The core temperature T1a is lower than the core temperature T1b after a lapse of the heating time t1.

On the other hand, the coil temperature T2a increases in the same curve as the coil temperature T2b but sharply increases after the elapsed time t3 for which the first induction coil 32 and the second induction coil 33 were moved. This results from that the passing amount of magnetic flux to the coil end core 12a decreased.

The coil temperature T2a after a lapse of the heating time t1 is higher than the coil temperature T2b.

Movement of the first induction coil 32 and the second induction coil 33 decreases the temperature of the stator core 11 and increases the temperature of the coil end 12a after a lapse of the heating time t1 as shown in FIG. 5. Accordingly, a first temperature difference dT1 which is the difference in temperature between the stator core 11 and the coil end 12a after a lapse of the soaking time t2 becomes lower than a second temperature difference dT2 obtained in the case where the induction coils 32 and 33 are not moved.

Thus, the soaking time t2 can be set to be shorter, leading to a reduction in total cycle time in the stator production process.

In this embodiment, the applicants confirmed that the case where the first induction coil 32 and the second induction coil 33 were moved could shorten the soaking time t2 by about 10% than the case where the first induction coil 32 and the second induction coil 33 were not moved.

The reduction in cycle time in the production process of the stator 10 can increase an amount of production per production process and reduce lead time, thus resulting in cost reduction.

The above simple method can contribute to cost reduction and hence can provide high cost advantage. Furthermore, the above method can be applied to even the case of processing stators 10 of different types in the same production line.

Furthermore, the production process is controlled based on the temperature by the temperature measuring system 34 and therefore variations of the stators 10 due to dimensional tolerance during production thereof can be absorbed. The stator core 11 of the stator 10 is produced in a manner of laminating steel sheets and the coil 12 is also produced in a manner of winding the wire 14. As a result, some variations occur due to dimensional tolerance. On the other hand, even when the positions of the first induction coil 32 and the second induction coil 33 are merely changed by several millimeters, the heating state of the stator 10 changes. The heating state may also change slightly according to the dimensional tolerance of a product. However, the process is controlled based on the temperature and hence it can conceivably follow even the dimensional tolerance.

Furthermore, the heating device of the present invention able to provide the above effects also can be used as a testing machine for seeking the position at which the soaking time t2 can be minimized for mass production.

If it is used in a line for mass production, it is unnecessary to perform the temperature control using the temperature measuring system 34. Specifically, it may be arranged such that data on the elapsed time t3 for which the temperature of the stator 10 becomes optimum is obtained in advance and stored in the control unit 35 and, after the elapsed time t3 lapses from the start of induction heating, the first induction coil 32 and the second induction coil 33 are moved by the first movement unit 38a and the second movement unit 38b.

When another stator 10 is to be induction heated, the same heating device 30 is used because parts or components are equal in size to those of the previous stator 10, the heating conditions are considered to be largely unchanged. The advantage of following the dimensional tolerance in the temperature control goes away. However, it is unnecessary to control the stator 10 by measuring it by the core temperature measuring element 36 and the coil temperature measuring element 37 and calculating a temperature difference by the temperature measuring system 34. The device therefore can be simplified and reduced in cost.

Furthermore, the heating device 30 using the temperature measuring system 34, the core temperature measuring element 36, and the coil temperature measuring element 37 may be combined with a method of controlling by the elapsed time t3.

As explained above, the stator heating method and heating device shown in this embodiment can provide the following configurations, operations, and effects.

(1) The heating method for heating the stator 10 formed in a manner that the coil 12 is mounted on the stator core 11 formed of laminated steel sheets is achieved by disposing the first induction coil 32 near one of the coil ends 12a of the stator 10 and the second induction coil 33 near the other coil end 12a, and energizing the first induction coil 32 and the second induction coil 33 to induction heat the stator 10 as pre-heating prior to a resin-molding process or a varnish applying process of the coil ends 12a. The method includes the first movement unit 38a for moving the first induction coil 32 in the axial direction of the stator 10 and the second movement unit 38b for moving the second induction coil 33 in the axial direction of the stator 10. The first induction coil 32 is moved by the first movement unit 38a, the second induction coil 33 is moved by the second movement unit 38b, and the first induction coil 32 and the second induction coil 33 are energized, thereby induction heating the stator 10. Accordingly, the first induction coil 32 and the second induction coil 33 can be moved to respective optimum positions for heating the stator 10, thereby reducing temperature variations occurring in the stator 10.

If such temperature variations are small, the subsequent time needed for holding the stator 10 in the hot-air oven to uniformize the temperature of the stator 10 can be shortened. Thus, the temperature of the stator 10 can be efficiently uniformized.

(2) In the heating method of the stator 10 described in (1), the temperature measuring system 34 is provided to measure the temperatures of the coil end 12a and the stator core 11 of the stator 10. Based on the temperature difference dT between the coil end 12a and the stator core 11 measured by the temperature measuring system 34, the first induction coil 32 is moved by the first movement unit 38a and the second induction coil 33 is moved by the second movement unit 38b. Accordingly, the positions of the first induction coil 32 and the second induction coil 33 can be adjusted while the temperatures are monitored. Thus, more effective induction heating can be achieved.

(3) In the heating method of the 10 described in (1), if the temperature difference dT is larger than the preset value, the first induction coil 32 and the second induction coil 33 are moved away from the stator core 11 by the first movement unit 38a and the second movement unit 38b to adjust the temperature of the stator 10. Since the coils 32 and 33 are disposed apart from the stator core 11 if the temperature difference dT is larger, the coil end 12a can be intensively heated, thus reducing the temperature difference.

(4) The heating device for heating the stator 10 formed in a manner that the coil 12 is mounted on the stator core 11 formed of laminated steel sheets comprises the first induction coil 32 to be disposed near one of the coil ends 12a of the stator 10 and the second induction coil 33 to be disposed near the other coil end 12a. When the first induction coil 32 and the second induction coil 33 are energized, the stator 10 is induction heated as pre-heating prior to a resin-molding process or a varnish applying process of the coil ends 12a. The device further includes the first movement unit 38a for moving the first induction coil 32 in the axial direction of the stator 10, the second movement unit 38b for moving the second induction coil 33 in the axial direction of the stator 10, and the control unit 35 for controlling the first movement unit 38a and the second movement unit 38b. Accordingly, the first induction coil 32 and the second induction coil 33 can be moved to respective optimum positions for heating the stator 10, thereby reducing temperature variations occurring in the stator 10.

If such temperature variations are reduced, the subsequent time needed for holding the stator 10 in the hot-air oven to uniformize the temperature of the stator 10 can be shortened. Thus, the temperature of the stator 10 can be uniformized efficiently.

(5) In the heating method of the 10 described in (4), the device includes the temperature measuring system 34 for measuring the temperature of the coil end 12a and the stator core 11 of the stator 10. Based on the temperature difference dT between the coil end 12a and the stator core 11 measured by the temperature measuring system 34, the control unit 35 causes the first movement unit 38a to move the first induction coil 32 and the second movement unit 38b to move the second induction coil 33. Accordingly, temperature variations in the stator 10 can be minimized.

The present invention is explained referring to the above embodiment but is not limited thereto. The invention may be embodied in other specific forms without departing from the essential characteristics thereof.

For instance, in the above embodiment, the coil 12 of the stator 10 is formed of the wound wire 14. As alternates the coil 12 may be a thin-sheet laminated coil or an edgewise wound coil.

In the above embodiment, the first induction coil 32 and the second induction coil 33 are moved away from the initial positions along the flowchart in FIG. 4 to go away from the stator core 11 of the stator 10. However, another method may be adopted in which the first induction coil 32 and the second induction coil 33 are firstly energized in the positions apart from the stator core 11 of the stator 10 for induction heating thereof and, after a fixed time or when a predetermined temperature difference appears, the first induction coil 32 and the second induction coil 33 are moved close to the stator core 11 of the stator 10. The control may be changed to heat the stator 10 to an optimum temperature in this way.

The above embodiment may be combined and used with a technique studied by the applicants.

List of Reference Signs
10 Stator
11 Stator core
11a Core end face
12 Coil
12a Coil end
13 Insulator
14 Wire
30 Heating device
31 Power supply
32 First induction coil
33 Second induction coil
34 Temperature measuring system
35 Control unit
36 Core temperature measuring element
37 Coil temperature measuring element
38 Position adjustment device
38a First movement unit
38b Second movement unit

The invention claimed is:

1. A method for heating a stator formed such that a conducting coil is mounted on a stator core formed of laminated steel sheets, the method comprising:
disposing a first induction coil near one of the coil end parts of the stator and a second induction coil near the other coil end part,
energizing the first induction coil and the second induction coil to induction heat the coil end parts of the stator prior to a resin-molding process or a varnish applying process,
wherein the method further includes:
moving the first induction coil in an axial direction of the stator with a first movement device; and
moving the second induction coil in the axis direction of the stator with a second coil movement device,
measuring temperatures of the coil end part and the stator core of the stator with a temperature measuring device, and
based on a temperature difference between the coil end part and the stator core measured by the temperature measuring device,
moving the first induction coil with the first coil movement device and the second induction coil with the second coil movement device.

2. The method of heating the stator according to claim 1, wherein
if the temperature difference is smaller than a preset value, the first induction coil and the second induction coil are moved close to the stator core with the first coil movement device and the second coil movement device to adjust the temperature of the stator.

3. The method of heating the stator according to claim 2, wherein
if the temperature difference is larger than a preset value, the first induction coil and the second induction coil are moved away from the stator core with the first coil movement device and the second coil movement device to adjust the temperature of the stator.

4. A method for heating a stator formed such that a conducting coil is mounted on a stator core formed of laminated steel sheets, the method comprising disposing a first induction coil near one of the coil end parts of the stator and a second induction coil near the other coil end part,
energizing the first induction coil and the second induction coil to induction heat the coil end parts of the stator prior to a resin-molding process or a varnish applying process,
wherein the method further includes:
moving the first induction coil in an axial direction of the stator with a first coil movement device; and
moving the second induction coil in the axis direction of the stator with a second coil movement device,
wherein the method further includes a control device that controls the first coil movement device and the second coil movement device, and
after a lapse of a predetermined time, the control device controls the first coil movement device to move the first induction coil and controls the second coil movement device to move the second induction coil, and
based on data from the increased temperature of the stator when heated by the first and second induction coils which have not yet been moved is obtained in advance and the predetermined time is determined based on the data.

5. A device for heating a stator formed such that a conducting coil is mounted on a stator core formed of laminated steel sheets, the device comprising:
a first induction coil to be disposed near one of coil end parts of the stator and a second induction coil to be disposed near the other coil end part, the first induction coil and the second induction coil being arranged to be energized to induction heat the coil end parts of the stator prior to a resin-molding process or a varnish applying process,
wherein the device further includes:
a first coil movement device that moves the first induction coil in an axial direction of the stator;
a second coil movement device that moves the second induction coil in the axis direction of the stator; and
a control device that controls the first coil movement device and the second coil movement,
the device for heating a stator includes a temperature measuring device that measures temperatures of the coil end part and the stator core of the stator, and
the control device is adapted to control, based on a temperature difference between the coil end part and the stator core measured by the temperature measuring device, the first coil movement device to move the first induction coil and the second coil movement device to move the second induction coil.

* * * * *